(12) United States Patent
Hasegawa

(10) Patent No.: US 7,226,301 B2
(45) Date of Patent: *Jun. 5, 2007

(54) CARD ATTACHMENT/DETACHMENT DEVICE

(75) Inventor: Manabu Hasegawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/263,948

(22) Filed: Nov. 2, 2005

(65) Prior Publication Data

US 2006/0063408 A1 Mar. 23, 2006

Related U.S. Application Data (62) Division of application No. 10/049,294, filed as application No. PCT/JP00/03811 on Jun. 12, 2000, now Pat. No. 6,974,338.

(51) Int. Cl.
H01R 13/62 (2006.01)

(52) U.S. Cl. ..................................... 439/159

(58) Field of Classification Search ................ 439/159, 439/160, 630
See application file for complete search history.

(56) References Cited

U.S. PATENT DOCUMENTS 6,102,720 A * 8/2000 Tung ........................... 439/159

FOREIGN PATENT DOCUMENTS

| | | |
|---|---|---|
| DE | 195 45 502 C1 | 6/1997 |
| EP | 0 236 846 | 9/1987 |
| EP | 0 743 717 | 11/1996 |
| EP | 0749088 | 12/1996 |
| EP | 0 940 765 A2 | 9/1999 |
| EP | 977139 | 2/2000 |
| FR | 2722593 | 1/1996 |
| GB | 2326050 | 12/1998 |
| JP | 61139895 | 6/1986 |
| JP | 2-91183 | 7/1990 |
| JP | 11-242972 | 9/1999 |
| JP | 2001-307028 | 11/2001 |

* cited by examiner

*Primary Examiner*—Gary F. Paumen
(74) *Attorney, Agent, or Firm*—Oblon, Spivak, McClelland, Maier & Neustadt, P.C.

(57) ABSTRACT

A card attachment/detachment device includes a card accommodation section arranged at any one of the body and the lid; a terminal arranged at the other to comes into contact with a card placed in the card accommodation section and to press the card toward the card accommodation section; a stopper section constituting a part of a card insertion/removal opening communicating with the card accommodation section and coming into contact with a part of the card placed in the card accommodation section; and a first biasing means pressing the card toward the stopper section when the card is placed in the card accommodation section and ejecting the card to the outside through the card insertion/removal opening when the card is removed from the card accommodation section.

1 Claim, 6 Drawing Sheets

FIG. 16

CARD ATTACHMENT/DETACHMENT DEVICE

TECHNICAL FIELD

The invention relates to a contact device applicable to a cordless telephone, and especially relates to a card attachment/detachment device holding detachably a subscriber identification module or SIM card.

BACKGROUND ART

Figure 1:
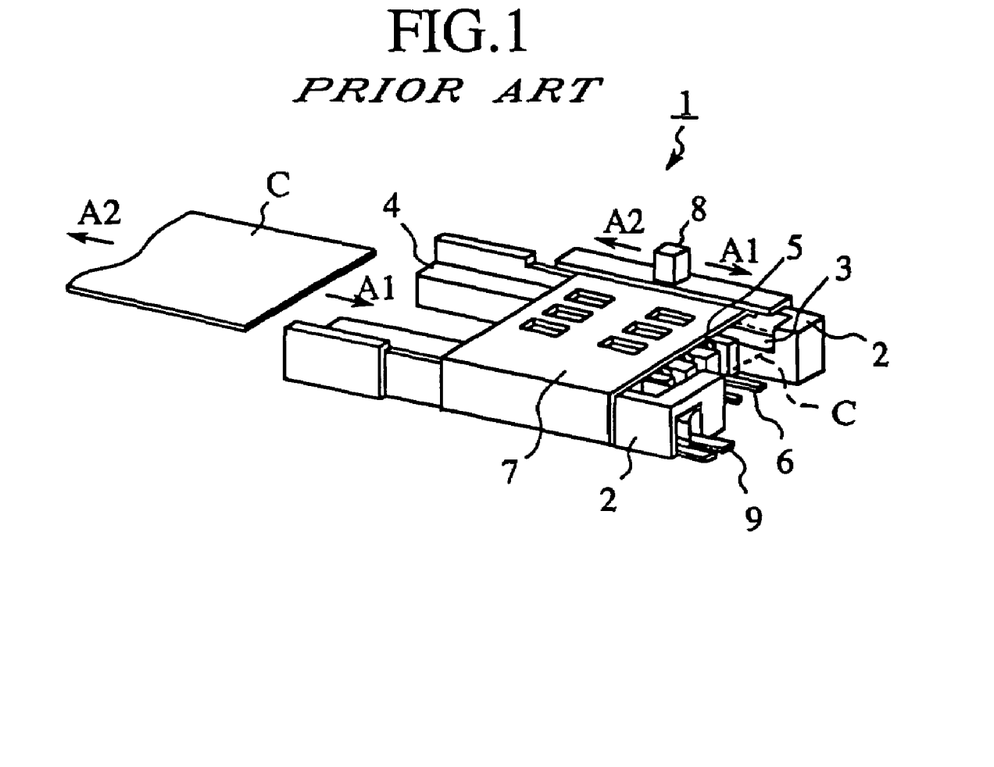
FIG. 1 is a perspective view of an outward appearance of a conventional card attachment/detachment device.

FIG. 1 is a perspective view of an outward appearance of a conventional card attachment/detachment device. In the drawing, a reference numeral 1 denotes a body of the card attachment/detachment device, which is constituted by a pair of guide members 2 each extending in a direction of inserting the SIM card (hereafter, referred simply as a card) C. A reference numeral 3 denotes a card accommodation section, which is defined so as to straddle a space between the pair of the guide members 2. A reference numeral 4 denotes a card insertion/removal opening defined between the respective ends of the pair of the guide members 2. The card insertion/removal opening 4 is flush with the end of the card accommodation section 3. Terminals 5 are arranged at a lower portion of the card accommodation section 3, each coming into contact with the card C in a space between the pair of the guide members 2. A reference numeral 6 denotes an external terminal to connect the terminals 5 with external devices (not shown) such as the cordless telephone and so on. A rid 7 having an inverted L-letter shape in cross section is arranged reciprocally in longitudinal directions (indicated by arrows A1 and A2) of the body 1 at an upper portion of the card accommodation section 3. A reference numeral 8 denotes an operating lever moving the lid 7 in the longitudinal directions of the body 1.

Next, an operation will be explained.

First, when the card C is placed in the device, the operating lever 8 is operated in the direction indicated by the arrow A1 to bring the lid 7 close to the card insertion/removal opening 4. In this way, the card C is moved in the direction indicated by the arrow A1 to insert into the card accommodation section 3 through the card insertion/removal opening 4. At this time, the card C is engaged with an engagement means (not shown) arranged at a lower portion of the lid 7 and held by the lid 7.

Next, the operating lever 8 is operated in the direction A1 to hold the card C at a predetermined position in the card accommodation section 3. At the predetermined position, the card C is electrically connected with the external devices through the terminals 5.

On the other hand, when the card C is removed from the device, the operating lever 8 is operated in the direction indicated by the arrow A2 to return the lid 7 to the card insertion/removal opening 4. In this way, the electrical connection between the card C and the external device is released to expose a part of the card C ejected from the card insertion/removal opening 4 to allow pulling out the card by fingers.

Incidentally, with the above card attachment/detachment device, the card C is generally energized through the terminals 5. Upon energizing, the card C may be inserted into or removed from the device. That is, when 'insertion or removal of a live wire' is performed, there has been the fear of damaging circuits of the cordless telephones or the card C itself. To apply power to the card C only when the card C is placed in the device, a detection means 9 is arranged at the body as shown in FIG. 1. The detection means 9 determines whether the card C is placed at a predetermined position in the card accommodation section 3 or not.

However, the above conventional card attachment/detachment device does not have a structure allowing holding the card C in the insertion/removal directions (indicated by arrows A1 and A2) of the card C. When the device falls down in conjunction with the cordless telephone acting as the external device for example, the card C may move instantly from a predetermined position in the card accommodation section 3 in the direction A2 and may then return immediately to the predetermined position. In this case, there has been the fear of misidentifying that the card C is not placed at the predetermined position due to the detection means 9 in spite of the return of the card C to the predetermined position. At this time, since applying power to the card C is stopped, there are inconveniences that the external device such as the cordless telephones cannot be used temporarily for example.

JP-A-1998/336292 discloses a cordless telephone made to solve the inconveniences, the cordless telephones providing with a card attachment/detachment device arranged at a position where a battery pack is disposed.

However, with the construction disclosed in the gazette above, it is necessary to remove the battery every time the card C is inserted into or removed from the device. Therefore, the construction has inferior usability.

The invention was made to solve the foregoing problems. An object of the invention is to provide a card attachment/detachment device ensuring holding the card even if the device undergoes external forces such as an impact due to dropping and preventing misidentification with respect to the presence or absence of the card in the device without removing the battery.

DISCLOSURE OF THE INVENTION

A card attachment/detachment device according to the invention holding device holding detachably a card in a space defined between a body and a lid, comprises a card accommodation section arranged at any one of the body and the lid; a terminal arranged at the other to comes into contact with a card placed in the card accommodation section and to press the card toward the card accommodation section; a stopper section constituting a part of a card insertion/removal opening communicating with the card accommodation section and coming into contact with a part of the card placed in the card accommodation section; and a first biasing means pressing the card toward the stopper section when the card is placed in the card accommodation section and ejecting the card to the outside through the card insertion/removal opening when the card is removed from the card accommodation section. In this way, it is possible to ensure that the card is held in the card accommodation section. Therefore, it is possible to prevent performing 'insertion or removal of a live wire' caused by ejection of the card even if the card undergoes external forces such as an impact caused by dropping.

With the above arrangement, it may further comprise a cap arranged detachably at the card insertion/removal opening. In this way, it is possible to ensure that the card is held in the card accommodation section. Therefore, it is possible to prevent performing 'insertion or removal of a live wire' caused by ejection of the card even if the card undergoes external forces such as an impact caused by dropping.

With the above arrangement, it may further comprise an operating means arranged to release pressure of the first biasing means applied to the card against the stopper section. In this way, it is possible to insert the card into the device or remove the card therefrom without directly coming into contact with the card. Therefore, it is possible to improve operability regarding handling the card.

With the above arrangement, it may further comprise a rib arranged at a part of the card accommodation section, the rib coming into contact with a distinctive shaped section of the card when the card is placed in the card accommodation section. In this way, it is possible to control directions that the card is inserted, and to prevent the card from error insertion.

A card attachment/detachment device according to the invention holding detachably a card in a space defined between a body and a lid, comprises: a card accommodation section arranged at any one of the body and the lid; a stopper section constituting a part of a card insertion/removal opening, which communicates with the card accommodation section displaced from the card insertion/removal opening in a width direction of the card, and coming into contact with a part of the card placed in the card accommodation section; an engagement means engaging with the card within the card accommodation section; and an operating means moving the card to place a part of the engaged card in contact with the stopper section. In this way, it is possible to ensure that the card is held in the card accommodation section. Therefore, it is possible to prevent performing 'insertion or removal of a live wire' caused by ejection of the card even if the card undergoes external forces such as an impact caused by dropping.

With the above arrangement, it may further comprise a second biasing means pressing the engagement means in a direction of crossing a direction of insertion of the card. In this way, it is possible to ensure that the engagement means is held in the card accommodation section. Therefore, it is possible to prevent performing 'insertion or removal of a live wire' caused by ejection of the card even if the card undergoes external forces such as an impact caused by dropping.

With the above arrangement, it may further comprise a third biasing means ejecting the engagement means to the outside through the card insertion/removal opening. In this way, it is possible to insert the card into the device or remove the card therefrom without directly coming into contact with the card. Therefore, it is possible to improve operability regarding handling the card.

With the above arrangement, it may further comprise a rib arranged at the engagement means, the rib coming into contact with a distinctive shaped section of the card when the card is placed in the card accommodation section. In this way, it is possible to control directions that the card is inserted, and to prevent the card from error insertion.

With the above arrangement, it may further comprise a rib arranged at the card accommodation section, the rib coming into contact with a distinctive shaped section of the card when the card is placed in the card accommodation section. In this way, it is possible to control directions that the card is inserted, and to prevent the card from error insertion.

A card attachment/detachment device according to the invention holding detachably a card in a space defined between a body and a lid, comprises: a holder allowing being inserted into and removed from the space and having a card accommodation section accommodating the card; a lock means holding the holder within the space; a release means releasing the lock of the lock means; and a biasing means ejecting the engagement means to the outside when the card is removed from the card accommodation section.

In this way, it is possible to insert the card into the device or remove the card therefrom without directly coming into contact with the card. Therefore, it is possible to improve operability regarding handling the card.

With the above arrangement, it may further comprise a rib arranged at a part of the card accommodation section, the rib coming into contact with a distinctive shaped section of the card when the card is placed in the card accommodation section. In this way, it is possible to control directions that the card is inserted, and to prevent the card from error insertion.

BRIEF DESCRIPTION OF THE DRAWINGS

FIG. 3A to FIG. 3C are views of the card attachment/detachment device shown in FIG. 2 before a card is placed in the device.

FIG. 4A to FIG. 4C are views of the card attachment/detachment device shown in FIG. 2 after a card is placed in the device.

FIG. 15A to FIG. 15C are views of the card attachment/detachment device as embodiment 10 according to the invention after a card is placed in the device.

BEST MODES FOR CARRYING OUT THE INVENTION

To explain the invention more in detail, the best modes of carrying out the invention will be described with reference to the accompanying drawings.

Embodiment 1

Figure 2:
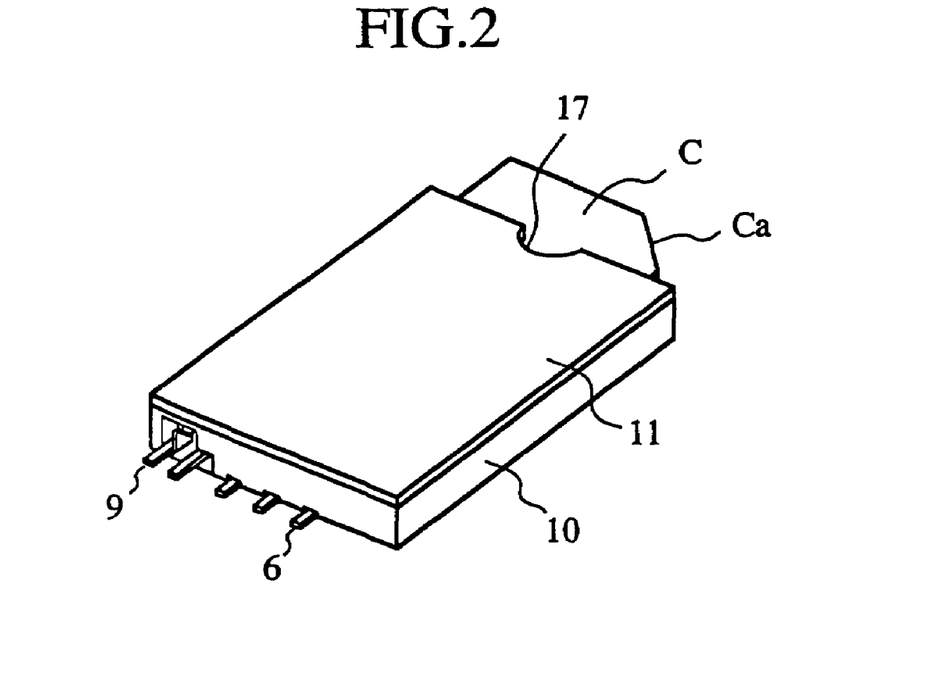
FIG. 2 is a perspective view of an outward appearance of a card attachment/detachment device as embodiment 1 according to the invention.
Figure 3A:
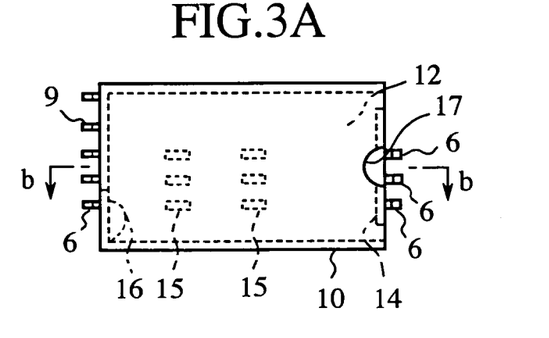
FIG. 3A is a bottom view of the card attachment/detachment device shown in FIG. 2.
Figure 3B:
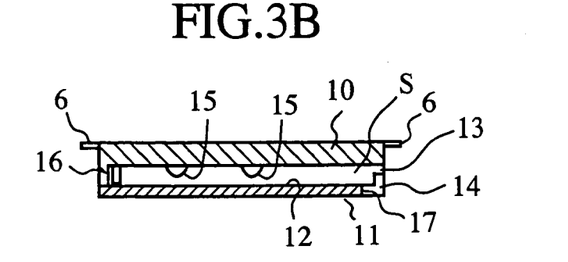
FIG. 3B is a cross sectional view taken along lines b—b of FIG. 3A.
Figure 3C:
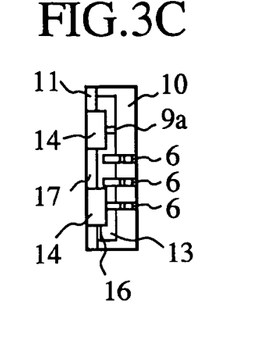
FIG. 3C is a side view of FIG. 3A.
Figure 4A:
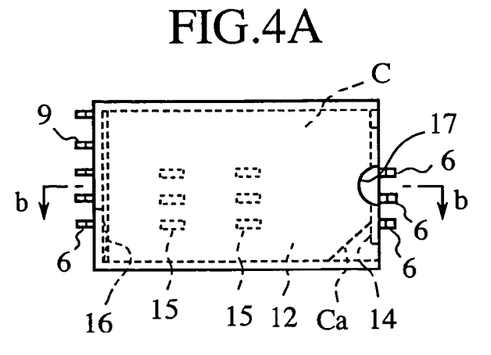
FIG. 4A is a bottom view of the card attachment/detachment device shown in FIG. 2.
Figure 4B:
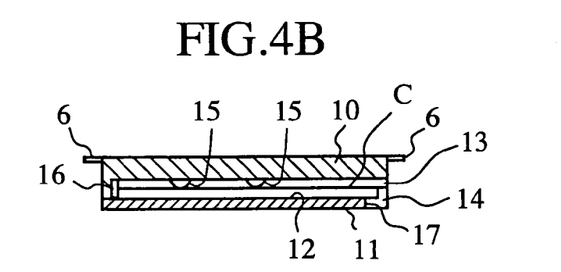
FIG. 4B is a cross sectional view taken along lines b—b of FIG. 4A.
Figure 4C:
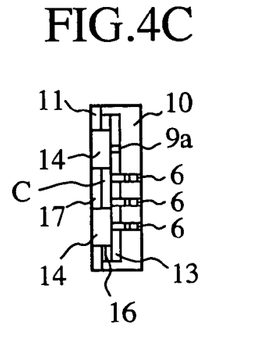
FIG. 4C is a side view of FIG. 4A.

FIG. 2 is a perspective view of an outward appearance of a card attachment/detachment device as embodiment 1 according to the invention. FIG. 3A to FIG. 3C are views of the card attachment/detachment device shown in FIG. 2 before a card is placed in the device. FIG. 3A is a bottom view of the card attachment/detachment device shown in FIG. 2. FIG. 3B is a cross sectional view taken along lines b—b of FIG. 3A. FIG. 3C is a side view of FIG. 3A. FIG. 4A to FIG. 4C are views of the card attachment/detachment device shown in FIG. 2 after a card is placed in the device. FIG. 4A is a bottom view of the card attachment/detachment device shown in FIG. 2. FIG. 4B is a cross sectional view taken along lines b—b of FIG. 4A. FIG. 4C is a side view of FIG. 4A. Components of the embodiment 1 common to those of the conventional card attachment/detachment device of FIG. 1 are denoted by the same reference numerals and further description will be omitted.

In the drawings, a reference numeral 10 denotes a plate-shaped body made from electrical insulating materials such as ABS resins, for example. A reference numeral 11 denotes a lid creating a space S, which allows accommodating the card C, defined between the body and the lid 11. The lid 11 has a card accommodation section 12. A reference numeral 13 denotes a card insertion/removal opening formed at an end of the lid 11 and communicates with the space S. A reference numeral 14 denotes a stopper section constituting a part of the card insertion/removal opening 13. The stopper section 14 prevents the card C, which is placed in the card accommodation section 12, from removing therefrom. A reference numeral 15 denotes terminals each formed at a lower face of the body 10 facing the card accommodation section 14. The respective terminals 15 press the card C against the card accommodation section 12. The terminals 15 connect with the external terminals 6, respectively. A reference numeral 16 denotes an ejection spring (first biasing means) mounted on an inner face of an edge-drooping section of the body 10. The ejection spring 16 presses the card C against the stopper section 14 when the card C is placed in the device and ejects the card C to the outside through the card insertion/removal opening 13 when the card C is removed from the device. A reference numeral 17 denotes a depression formed at the lid 11 constituting a part of the card insertion/removal opening 13. The depression 17 facilitates operating ejected portion of the card C by fingers when the card C is removed from the device. The detection means 9, which determines whether the card C is placed at a predetermined position in the card accommodation section 12 or not, is arranged at an end of the body 10. A probe 9a of the detection means 9 is arranged in the card accommodation section 12. Moreover, one of sharp edges of the rectangular-shaped card C is chamfered, and the chamfered portion is defined as a tilt section Ca having a distinctive shape of the card C.

Next, an operation will be explained.

First, when the card C is inserted into the device, the card C is inserted into the space S through the card insertion/removal opening 13. In the space S, the card C is pressed by the terminals 15, which is close to the body 10, toward the lid 11. Therefore, when the card C is continuously inserted, the card C is guided to place in the card accommodation section 12. At this time, the card C is continuously pressed by the terminals 15 toward the lid 11 and further pressed by the ejection spring 16 against the stopper section 14 close to the card insertion/removal opening 13. Since the card C is engaged with the stopper section 14, it is possible to ensure that the card C is held in the card accommodation section 12.

Next, when the card C is removed, an exposed end of the card C, which is placed in the card accommodation section 12, is lightly pressed toward the body 10 by fingers inserted into the depression 17 of the lid 11. In this way, engagement of the exposed end of the card C and the stopper section 14 is released, and the card C is removed from the card insertion/removal opening 13 to the outside due to the ejection spring 16.

As described above, with the embodiment 1, the stopper section 14 and the ejection spring 16 are disposed in the card accommodation section 12. In this way, it is possible to ensure that the card C is held in the card accommodation section 12. Therefore, it is possible to prevent performing 'insertion or removal of a live wire' caused by ejection of the card C even if the card C undergoes external forces such as an impact caused by dropping.

With the embodiment 1, since the ejection spring 16 is used to hold the card C, it is not necessary to provide with another biasing means for holding the card C. In this way, it is possible to reduce parts count of the device. With the embodiment 1, since the terminals 15 for coming into contact with the card C are used to press the card C against the card accommodation section 12, it is not necessary to provide with another biasing means for pressing the card C. In this way, it is possible to reduce parts count of the device.

With the embodiment 1, the card accommodation section 12 is arranged at the lid 11. Alternatively, the card accommodation section 12 may be arranged at the body 10. In this case, the terminals 15 must be arranged at a face, which faces the body 10, of the lid 11 because the terminals 15 further function as a means pressing the card C against the card accommodation section 12.

Embodiment 2

Figure 5:
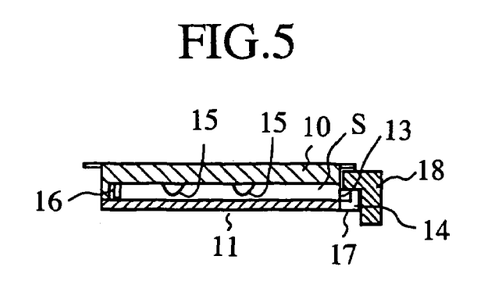
FIG. 5 is a cross sectional view of a card attachment/detachment device as embodiment 2 according to the invention.

FIG. 5 is a cross sectional view of a card attachment/detachment device as embodiment 2 according to the invention. Components of the embodiment 2 common to those of the embodiment 1 are denoted by the same reference numerals and further description will be omitted.

The embodiment 2 is characterized in that a cap 18 blocking the card insertion/removal opening 13 is arranged at the device. There is a possibility that the card C is pressed toward the card insertion/removal opening 13 when a foreign material is inserted into the depression 17 of the lid 11 and is accidentally ejected to the outside due to the ejection spring 16. Therefore, the cap 18 prevents the card C from ejecting.

As described above, with the embodiment 2, the cap 18 blocking the card insertion/removal opening 13 is arranged at the device. In this way, it is possible to ensure that the card C is held in the card accommodation section 12. Therefore, it is possible to prevent performing 'insertion or removal of a live wire' caused by ejection of the card C even if the card C undergoes external forces such as an impact caused by dropping.

Embodiment 3

Figure 6:
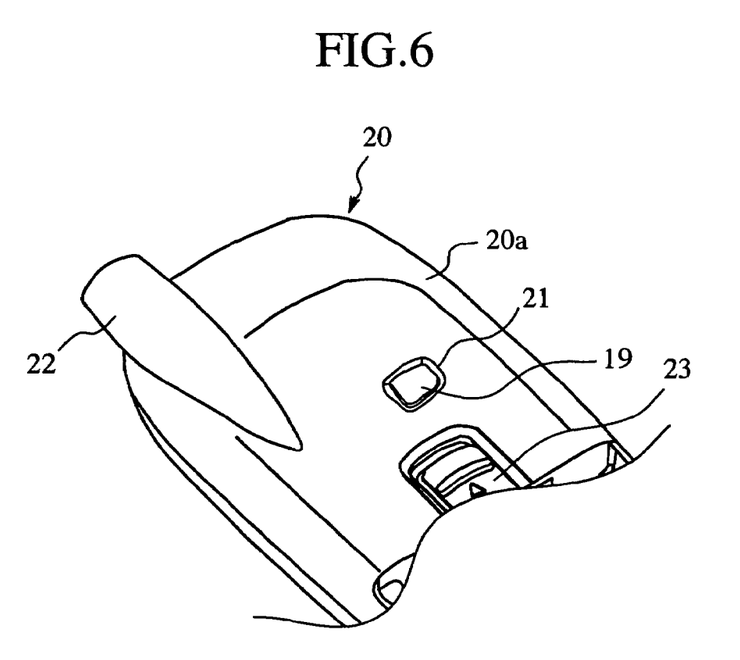
FIG. 6 is a perspective view of an outward appearance of a cordless telephone providing with a card attachment/detachment device as embodiment 3 according to the invention.

FIG. 6 is a perspective view of an outward appearance of a cordless telephone providing with a card attachment/detachment device as embodiment 3 according to the invention. Components of the embodiment 3 common to those of the embodiment 1 and soon are denoted by the same reference numerals and further description will be omitted.

The embodiment 3 is characterized in that an operating button 19 releasing engagement of the stopper section 14 and the card C is arranged at a rear face 20a of a cordless telephone 20. A hole 21 having a rectangular shape is formed at the rear face 20a of the cordless telephone 20, and the operating button 19 is reciprocally disposed in the hole 21. When the operating button 19 is pushed, the card C is pressed toward the body 10. Moreover, a reference numeral 22 denotes an extendable antenna mounted at an end of the cordless telephone 20, and a reference numeral 23 denotes a switch for removing a detachable battery pack (not shown) mounted at the rear face of the cordless telephone 20.

Next, an operation will be explained.

When the operating button 19 is pushed, a part of the card C is pressed toward the body 10, and the engagement of the stopper section 14 is released. The card C is ejected to the outside through the card insertion/removal opening 13 due to the ejection spring 16. As a result, the card C is removed from the device.

As described above, with the embodiment 3, the operating button 19 is arranged at the device. In this way, it is possible to insert the card C into the device or remove the card C therefrom without directly coming into contact with the card C. Therefore, it is possible to improve operability regarding handling the card C.

Embodiment 4

Figure 7:
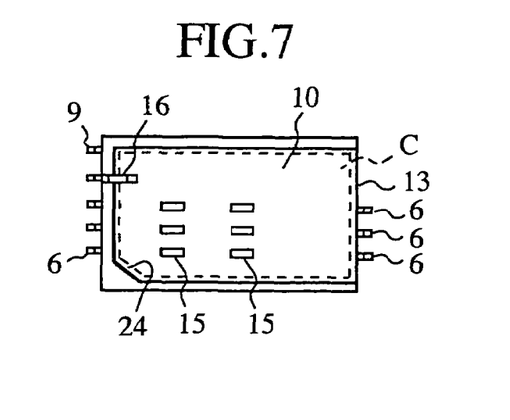
FIG. 7 is a plan view of a card accommodation section formed in a body of a card attachment/detachment device as embodiment 4 according to the invention.

FIG. 7 is a plan view of a card accommodation section formed in a body of a card attachment/detachment device as embodiment 4 according to the invention. Components of the embodiment 4 common to those of the embodiment 1 and so on are denoted by the same reference numerals and further description will be omitted.

The embodiment 4 is characterized in that a rib 24 is arranged at an inner wall, which constitutes a part of the card accommodation section 12 formed at the lid 11, of the body 10. The rib 24 comes into contact with the tilt section Ca having a distinctive shape of the card C placed in the card accommodation section 12. That is, when three corners of the card C other than the tilt section Ca come into contact with the rib 24 in the card accommodation section 12, the card C cannot further move forward. In this way, since users can understand that the card C is inserted in an error direction, it is possible to urge them to insert the card C in a correct direction.

With the embodiment 4, the rib 24 is arranged in the card accommodation section 12. In this way, it is possible to control directions that the card C is inserted, and to prevent the card from error insertion.

Embodiment 5

Figure 8:
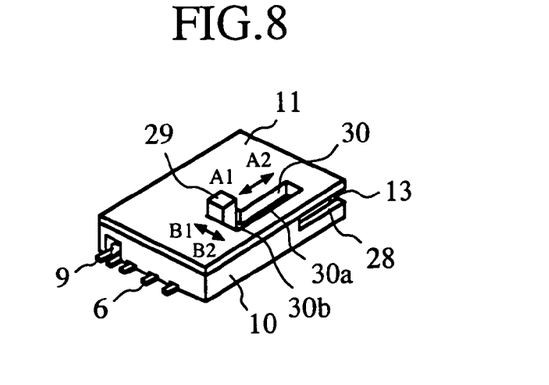
FIG. 8 is a perspective view of an outward appearance of a card attachment/detachment device as embodiment 5 according to the invention.
Figure 9:
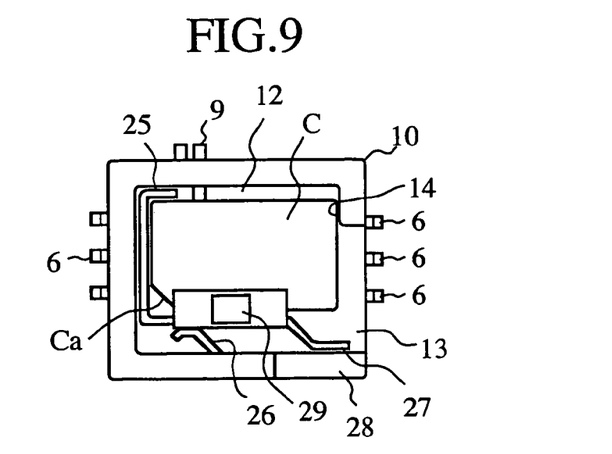
FIG. 9 is a plan view of a card accommodation section formed in a body of the card attachment/detachment device of FIG. 8 when a card is placed in the card accommodation section.
Figure 10:
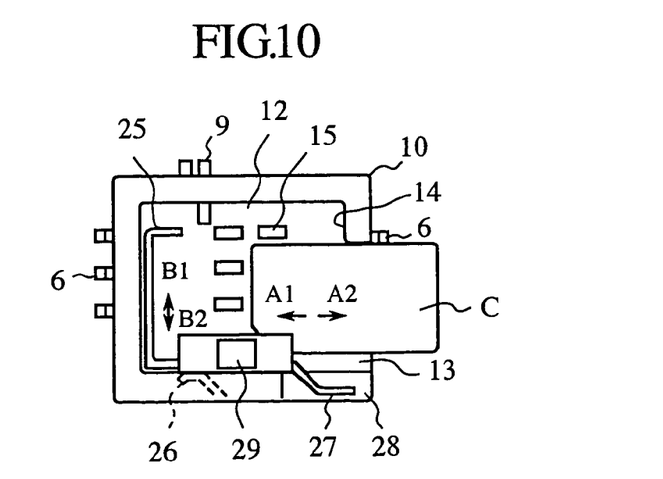
FIG. 10 is a plane view of the card accommodation section formed in the body of the card attachment/detachment device of FIG. 8 when the card is inserted into or removed from the card accommodation section.

FIG. 8 is a perspective view of an outward appearance of a card attachment/detachment device as embodiment 5 according to the invention. FIG. 9 is a plan view of a card accommodation section formed in a body of the card attachment/detachment device of FIG. 8 when a card is placed in the card accommodation section. FIG. 10 is a plane view of the card accommodation section formed in the body of the card attachment/detachment device of FIG. 8 when the card is inserted into or removed from the card accommodation section. Components of the embodiment 5 common to those of the embodiment 1 and so on are denoted by the same reference numerals and further description will be omitted.

With the embodiment 1 and so on, the card accommodation section 12 is displaced from the card insertion/removal opening 13 in a thickness direction of the card C. The embodiment 5 is characterized in that the card accommodation section 12 is displaced from the card insertion/removal opening 13 in a width direction of the card C. That is, the card accommodation section 12 is arranged at a position, which is displaced from the card insertion/removal opening 13 in the width direction of the card C, of the body 10. A part of the card insertion/removal opening 13 is defined as the stopper section 14. A frame 25 is arranged in the card accommodation section 12. The frame 25 acts as the engagement means allowing engaging with the card C and moving the engaged card C in the insertion/removal directions (indicated by the arrows A1 and A2) of the card C and in directions (indicated by arrows B1 and B2) rectangular to the insertion direction. The frame 25 has an L-letter shape allowing holding a lateral edge and a longitudinal edge adjacent thereto of four edges of the card C at one time. The frame 25 is pressed or biased in the direction B1 at all times by a spring (second biasing means) 26 arranged in the inner wall of the card accommodation section 12. A part of the frame 25 close to the card insertion/removal opening 13 has a shape corresponding to the tilt section Ca of the card C. The shape is defined as a guide section 27 guiding the card C inserted through the card insertion/removal opening 13 to the card accommodation section 12. The guide section 27 escapes into a frame escape opening 28, which is formed at the body 10 and is adjacent to the card insertion/removal opening 13, when the card C is inserted into the device. In this way, it is possible to ensure a wide opening of the card insertion/removal opening 13. An operating lever 29, which is used in moving the frame 25, is mounted at the frame 25. A lower portion of the operating lever 29 comes into contact with the spring 26 and an upper portion thereof projects from an about L-letter shaped operating hole 30, which is formed at the lid 11, to the outside. The operating hole 30 includes a first operating groove 30a extending in the directions A1 and A2 and a second operating groove 30b extending in the directions B1 and B2.

Next, an operation will be explained.

First, when the card C is inserted into the device, the operating lever 29 in the second operating groove 30b is moved toward the first operating groove 30a. When the operating lever 29 is moved in the direction A2, it is possible to embrace insertion of the card C. At this time, when the card C is inserted in the direction A1 through the card insertion/removal opening 13, the card C is engaged with the frame 25. Next, when the operating lever 29 is operated from the first operating groove 30a to the second operating groove 30b, the frame 25 is pressed in the direction B1 due to the spring 26. The frame 25 is pressed until the longitudinal edge of the card C comes into contact with the detection means 9 and one corner of the card C comes into contact with the stopper section 14, and the card C is placed in the card accommodation section 12. Since a part of the card C comes into contact with the stopper section 14, there is no case that the card C is ejected to the outside through the card insertion/removal opening 13 even if the device undergoes external forces such as an impact due to dropping.

Next, when the card C is removed from the device, the operating lever 29 is operated in the direction B2 against a biasing force of the spring 26 to release contact between the one corner of the card C and the stopper section 14. The operating lever 29 is then operated in the direction A2 to guide the card C engaged with the frame 25 to a position close to the card insertion/removal opening 13. In such a state, it is possible to pull out the card C by fingers.

As described above, with the embodiment 1, the card C mounting on the frame 25 can be moved to a position allowing that the card C is engaged with the stopper section 14. In this way, it is possible to ensure that the card C is held in the card accommodation section 12. Therefore, it is possible to prevent performing 'insertion or removal of a live wire' caused by ejection of the card C even if the card C undergoes external forces such as an impact caused by dropping.

With the embodiment 5, since the operating lever 29 is arranged at the device, it is possible to insert into and remove from the device without directly coming into contact with the card C. Therefore, it is possible to improve operability regarding handling the card C.

With the embodiment 5, since the spring 26 is arranged at the device, it is possible to press the frame 25 in the direction B1 rectangular to the insertion direction of the card C. Therefore, it is possible to ensure that the card C, whose corner comes into contact with the stopper section 14, is held in the card accommodation section 12.

Moreover, with the embodiment 5, the card accommodation section 12 is arranged at the body 10. Alternatively, it is needless to say that the card accommodation section 12 may be arranged at the lid 11.

Embodiment 6

Figure 11:
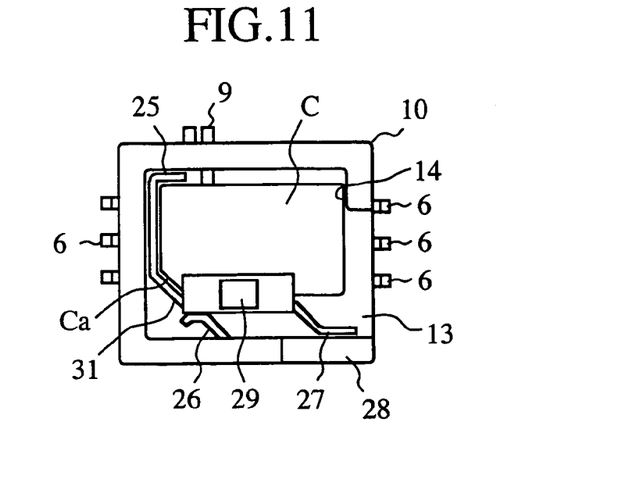
FIG. 11 is a plan view of a card accommodation section formed in a body of the card attachment/detachment device as embodiment 6 according to the invention when a card is placed in the card accommodation section.

FIG. 11 is a plan view of a card accommodation section formed in a body of the card attachment/detachment device as embodiment 6 according to the invention when a card is placed in the card accommodation section. Components of the embodiment 6 common to those of the embodiment 1 and so on are denoted by the same reference numerals and further description will be omitted.

The embodiment 6 is characterized in that a bent section 31 coming into contact with the tilt section Ca having a distinctive shape of the card C is arranged at a bent portion of the frame 25 of the embodiment 5. That is, when three corners of the card C other than the tilt section Ca come into contact with the bent section 31 of the frame 25 in the card accommodation section 12, the card C cannot further move forward. In this way, since users can understand that the card C is inserted in an error direction, it is possible to urge them to insert the card C in a correct direction.

As described above, with the embodiment 6, the bent section 31 is arranged at the frame 25 disposed in the card accommodation section 12. In this way, it is possible to control directions that the card C is inserted, and to prevent the card C from error insertion.

Embodiment 7

Figure 12:
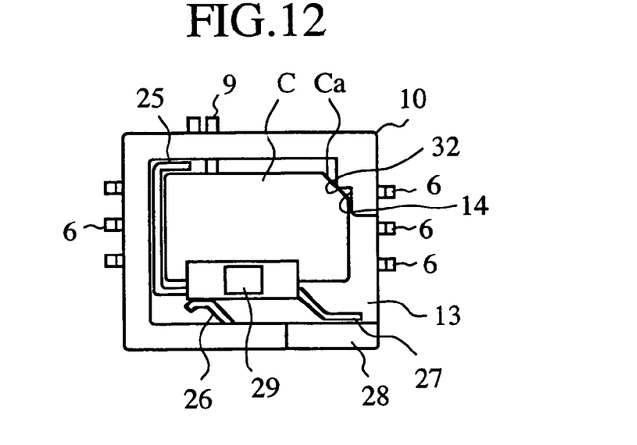
FIG. 12 is a plan view of a card accommodation section formed in a body of the card attachment/detachment device as embodiment 7 according to the invention when a card is placed in the card accommodation section.

FIG. 12 is a plan view of a card accommodation section formed in a body of the card attachment/detachment device as embodiment 7 according to the invention when a card is placed in the card accommodation section. Components of the embodiment 7 common to those of the embodiment 1 and so on are denoted by the same reference numerals and further description will be omitted.

The embodiment 7 is characterized in that a projection 32 coming into contact with the tilt section Ca having a distinctive shape of the card C is arranged at the stopper section 14. That is, when three corners of the card C other than the tilt section Ca come into contact with the projection 32 in the card accommodation section 12, the card C cannot further move forward. As a result, the card C cannot move to a predetermined position in the card accommodation section 12, especially to a position that the card C comes into contact with the detection means 9. In this way, since users can understand that the card C is inserted in an error direction, it is possible to urge them to insert the card C in a correct direction.

As described above, with the embodiment 7, the projection 32 is arranged at the stopper section 14 of the card accommodation section 12. In this way, it is possible to control directions that the card C is inserted, and to prevent the card C from error insertion.

Embodiment 8

Figure 13:
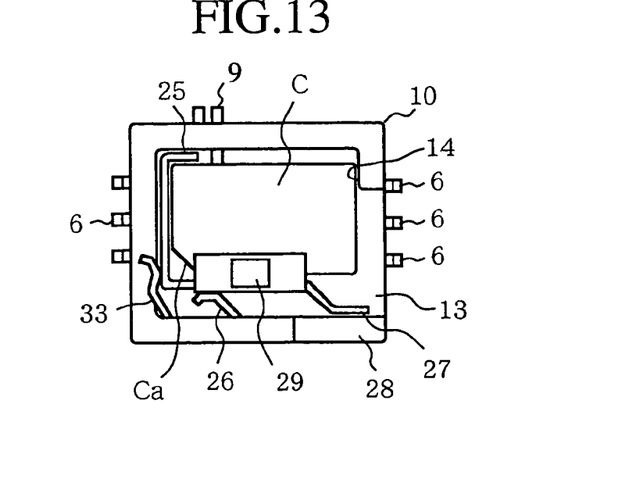
FIG. 13 is a plan view of a card accommodation section formed in a body of the card attachment/detachment device as embodiment 8 according to the invention when a card is placed in the card accommodation section.

FIG. 13 is a plan view of a card accommodation section formed in a body of the card attachment/detachment device as embodiment 8 according to the invention when a card is placed in the card accommodation section. Components of the embodiment 8 common to those of the embodiment 1 and so on are denoted by the same reference numerals and further description will be omitted.

The embodiment 8 is characterized in that a spring (third biasing means) 33 pressing the frame 25 engaged with the card C in the direction A2 at all times is arranged in the card accommodation section 12. That is, when the card C is removed, the operating lever 29 is operated in the direction B2 against the biasing force of the spring 26. As a result, one corner of the card is released from the stopper section, and the frame 25 is pressed in the direction A2 due to the spring 33. In this way, it is possible to remove the card C from the card insertion/removal opening 13 without operating the lever 29.

As described above, with the embodiment 8, the spring 33 is arranged at the device. In this way, since the card C can be ejected easily from the card insertion/removal opening 13 to the outside through the frame 25, it is possible to improve operability regarding handling the card C.

Embodiment 9

Figure 14:
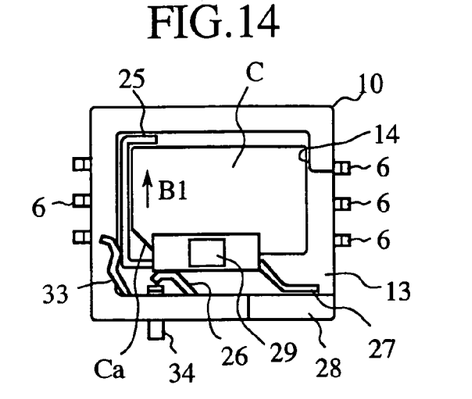
FIG. 14 is a plan view of a card accommodation section formed in a body of the card attachment/detachment device as embodiment 9 according to the invention when a card is placed in the card accommodation section.

FIG. 14 is a plan view of a card accommodation section formed in a body of the card attachment/detachment device as embodiment 9 according to the invention when a card is placed in the card accommodation section. Components of the embodiment 9 common to those of the embodiment 1 and so on are denoted by the same reference numerals and further description will be omitted.

The embodiment 9 is characterized in that a spring 34 is arranged at the inner wall of the card accommodation section 12. The spring 34 has two functions of the spring 26 arranged at the inner wall of the card accommodation section 12 and of the detection means 9 detecting the card C. The spring 34 presses the frame 25 and the card C in the direction B1 in collaboration with the spring 26 to determine whether the card C is placed at a predetermined position in the card accommodation section 3 or not.

As described above, with the embodiment 9, the spring 34 is arranged at the device. In this way, it is not necessary to provide with special detection means 9. Therefore, it is possible to reduce parts count of the device.

Embodiment 10

Figure 15A:
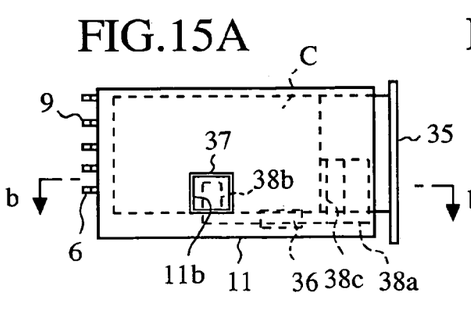
FIG. 15A is a bottom view of the card attachment/detachment device.
Figure 15B:
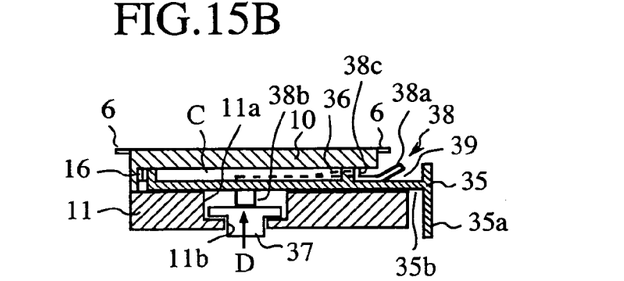
FIG. 15B is a cross sectional view taken along lines b—b of FIG. 15A.
Figure 15C:
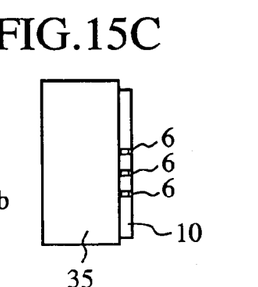
FIG. 15C is a side view of FIG. 15A.
Figure 16:
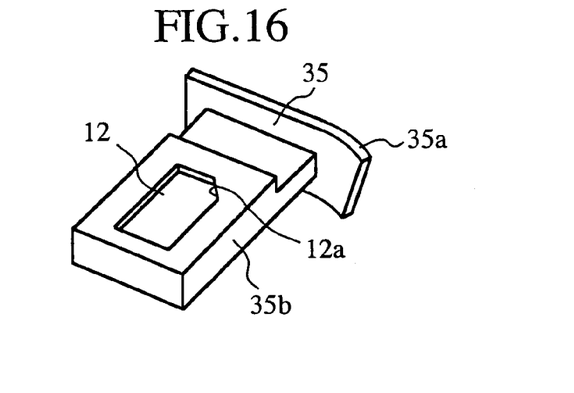
FIG. 16 is a perspective view of a holder allowing being inserted into and removed from the card attachment/detachment device of FIG. 15A to FIG. 15C.

FIG. 15A to FIG. 15C are views of the card attachment/detachment device as embodiment 10 according to the invention after a card is placed in the device. FIG. 15A is a bottom view of the card attachment/detachment device. FIG. 15B is a cross sectional view taken along lines b—b of FIG. 15A. FIG. 15C is a side view of FIG. 15A. FIG. 16 is a perspective view of a holder allowing being inserted into and removed from the card attachment/detachment device of FIG. .SA to FIG. 15C. Components of the embodiment 10 common to those of the embodiment 1 and so on are denoted by the same reference numerals and further description will be omitted.

The embodiment 10 is characterized by including a holder 35 allowing being inserted into and removed from the space S defined between the body 10 and the lid 11 and having a card accommodation section 12 accommodating the card C, a spring 36 acting as a lock means holding the holder 35 in the space S, an operating button 37 and a stopper 38 each acting as a release means releasing the lock operation due to the spring 36. The holder 35 includes a grasp section 35a and a plate 35b placed in the space S. The card accommodation section 12 is formed at an upper portion of the plate 35b. A rib 12a corresponding to the tilting section Ca of the card C is formed at the card accommodation section 12 of the embodiment 10 as shown in FIG. 16. A large hole 11a having a rectangular shape in cross section is formed at an upper central portion of the lid 11. A small hole 11b communicating with the large hole 11a and having a rectangular shape smaller than the large hole 11a is formed at a lower central portion of the lid 11. The operating button 37 is disposed in the large and small holes 11a and 11b. The stopper 38 is a plat spring extending from the operating button 37 to a holder insertion/removal opening 39 so as to weave the space S. The stopper 38 includes an upper section 38a projected from the holder insertion/removal opening 39 and bent upward, a lower section 38b coming into contact with the operating button 37, and a projection 38c formed between the lower section 38b and the upper section 38a and coming into contact with the lower face of the body 10. To bend the upper section 38a facilitates inserting the holder 35 into the holder insertion/removal opening 39 and removing it therefrom.

Next, an operation will be explained.

First, when the holder 35 is inserted into the device, the card C is placed in the card accommodation section 12 of the holder 35. The grasp section 35a of the holder 35 is then grasped to insert the holder 35 into the holder insertion/removal opening 39 defined between the stopper 38 and the lid 11. At this time, the holder 35 is pressed against the lid 11 due to the spring 36. In this way, the holder 35 is locked in the space S.

Next, when the holder 35 is removed from the device, the operating button 37 operates upward in the direction indicated by arrow D to elevate the lower section 38b of the stopper 38. At this time, the projection 38c of the stopper 38 is defined as a fulcrum. Since the stopper 38 elevates the spring 36, pressure of the spring 36 applied to the holder 35 is released. Simultaneously, the holder 35 is ejected toward the holder insertion/removal opening 39 due to the ejection spring 16. At this time, since the upper section 38a of the stopper 38 moves down when the operating button 37 is elevated, the ejection speed of the holder 35 is sharply reduced due to the upper section 38a. In this way, it is possible to prevent the card C from ejecting from the holder insertion/removal opening 39.

As described above, with the embodiment 10, the card accommodation section 12 is arranged at the holder 35. In this way, it is possible to insert the card C into the device or remove the card C therefrom without directly coming into contact with the card C. Therefore, it is possible to improve operability regarding handling the card C.

With the embodiment 10, the rib 12a corresponding to the tilt section Ca of the card C is formed in the card accommodation section 12 of the holder 35. In this way, it is possible to control directions that the card C is inserted, and to prevent the card C from error insertion.

INDUSTRIAL APPLICABILITY

As apparent from the foregoing, with the card attachment/detachment device according to the invention, it is possible to ensure that the card is held even if the device undergoes external forces such as an impact due to dropping. It is possible to prevent misidentification with respect to the presence or absence of the card in the device.

The invention claimed is:

1. A card attachment/detachment device holding detachably a card which has a plurality of electrodes arranged along a direction of attachment/detachment, said device comprising:
    a plurality of terminals configured to electrically contact with each of said electrodes on said card, respectively;
    a contacting member configured to contact with said card and configured to move with said card;
    a lock member configured to be placed in at least a locking position configured to lock the contacting member within a space and an unlocking position configured not to lock the contacting member within the space; and
    a biasing member configured to selectively eject said contacting member to a card insertion/removal opening based on a current position of said lock member, said biasing member configured to eject said contacting member to said card insertion/removal opening when said lock member is placed in said unlocking position, and said biasing member configured not to eject said contacting member when said lock member is placed in said locking position.

* * * * *